Aug. 7, 1945.　　　　E. R. BERGMANN　　　　2,381,252
CONNECTING MEANS FOR CONVEYER TROUGHS
Original Filed March 24, 1944

INVENTOR
Ernst R. Bergmann
Clarence F. Prole
ATTORNEY

Patented Aug. 7, 1945

2,381,252

UNITED STATES PATENT OFFICE 2,381,252

CONNECTING MEANS FOR CONVEYER TROUGHS

Ernst R. Bergmann, Chicago, Ill., assignor to Goodman Manufacturing Company, Chicago, Ill., a corporation of Illinois Original application March 24, 1944, Serial No. 527,924. Divided and this application April 5, 1944, Serial No. 529,691

7 Claims. (Cl. 198—220)

This invention relates to improvements in connecting means for conveyer troughs, and more particularly relates to a new and improved connecting means for connecting the troughs of a shaker conveyer trough line together.

This invention is a division of an application Serial No. 527,924, filed by me on March 24, 1944, and entitled Improvements in shaker conveyers.

The principal objects of my present invention are to provide a novel form of connecting means for the troughs of a shaker conveyer, which is operable from one side of the trough line, to facilitate connection of the troughs where the trough line is so close to a mine wall that it is difficult to get to both sides of the trough line to connect the troughs together.

In carrying out my invention I provide a connecting means for connecting the troughs of a shaker conveyer together, which includes means for connecting the troughs together at one side of the trough line and a clamping member operable from a position adjacent said connecting means and having spaced engaging faces adjacent the opposite side of the trough line, which are adapted to engage corresponding engaging faces on adjacent ends of the conveyer troughs, to draw and hold said ends of said troughs together.

Other objects of my invention will appear from time to time as the following specification proceeds and with reference to the accompanying drawing wherein.

Figure 1:
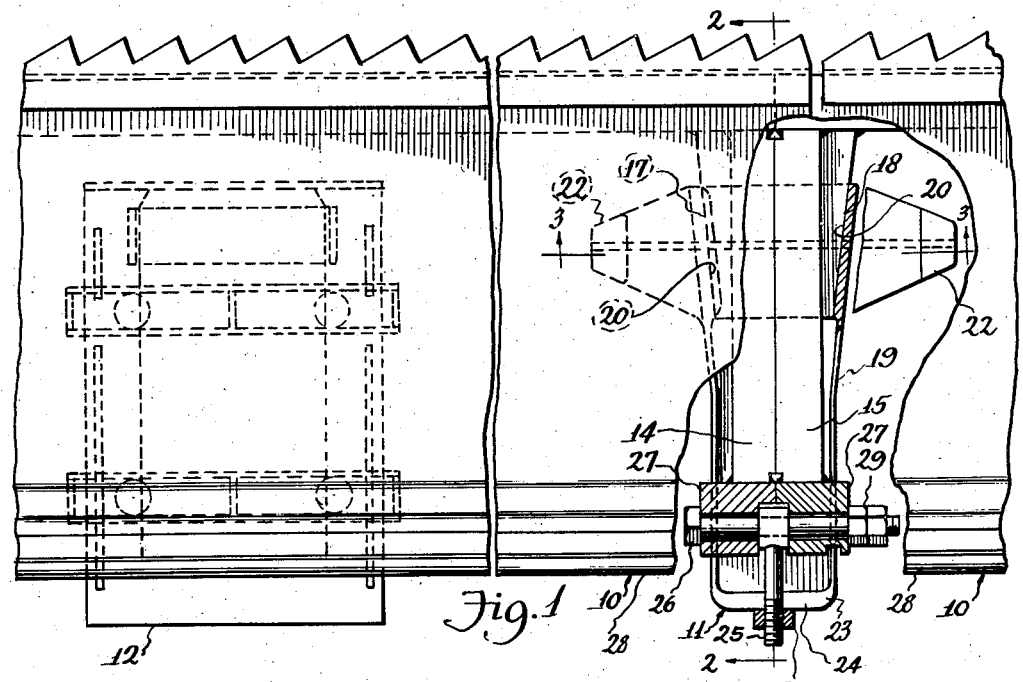
Figure 1 is a fragmentary top plan view of adjacent ends of two shaker conveyer face loading pans held in connected relation with respect to each other by a connecting means constructed in accordance with my invention, with parts of the pans broken away and parts of the connecting means shown in section.

In Figure 1 of the drawing, adjacent ends of two face loading pans 10, 10, connected together by a connecting means 11, are shown as being mounted on a ball frame 12, for reciprocable movement along the ground. Said ball frame, as herein shown, is arranged to support said face loading pan at an angle with respect to the ground as in my parent application Serial No. 527,924, and may be of a type similar to that shown in my parent application, so will not herein be shown or described in detail.

The connecting means 11, for connecting adjacent ends of the pans 10, 10 together, includes a pair of abutting plates 14 and 15 secured to the bottoms of adjacent ends of said loading pans and extending transversely thereacross, to form a flat abutting surface between said loading pans. Said loading pans are herein shown as being connected together in overlapping relation with respect to each other, so the abutting plate 14 is spaced from the end of its loading pan and the abutting plate 15 extends across the end of its loading pan. Said abutting plates 14 and 15 have inclined wedge-shaped surfaces 17 and 18, respectively, disposed adjacent one end of the pans and inclined outwardly from the joint between the pans, and diverging from the longitudinal center of the pans towards the outer side thereof. Said abutting surfaces, as herein shown, extend substantially perpendicular to the bottom of the pan and are spaced downwardly therefrom.

A clamping member 19 having oppositely inclined engaging surfaces 20, 20 adapted to slidably engage the engaging surfaces 17 and 18, is provided to draw the abutting plates 14 and 15 together by movement along said engaging surfaces, and to clamp said loading pans together when held stationary. Tongues 21, 21 project inwardly from said inclined surfaces of said clamping member and are adapted to extend within the grooves formed between the bottom of the loading pan and the engaging surfaces 17 and 18, to retain said clamping member thereon.

The clamping member 19 is provided with a pair of spaced engaging ends 22, 22 extending longitudinally of the loading pans, in opposite directions from the center thereof. Said ends are adapted to engage the bottoms of adjacent loading pans, to stabilize said clamping member and to limit the tendency for said loading pans to move with respect to each other about their point of connection together. The clamping member 19 has an outer portion 23 extending outwardly beyond the retaining edge of the loading pans 10, 10, in a direction away from the engaging surfaces 17 and 18, which has an upright apertured outer portion 24 extending longitudinally of the trough line, which is adapted to receive an eyebolt 25. The eye of said eyebolt is pivotally connected to a bolt 26 which extends longitudinally of said pans through abutting connecting lugs 27, 27, which are secured to the rear or outer sides of retaining walls 28, 28 of adjacent ends of said loading pans, and which have flat inner abutting surfaces in alignment with the abutting surfaces of the abutting plates 14 and 15. Lock nuts 29, 29 on said bolt 26 serve to hold one side of said loading pans together. A nut 30, threaded on the end of said eyebolt, abuts the outer side of said upright apertured portion 24, and serves to move said clamping member towards the side of the pan opposite from said connecting bolt, to wedge the troughs together as said nut is moved along said eyebolt towards the loading pans 10, 10, and also to hold said clamping member in a fixed position, to hold said loading pans in connected relation with respect to each other.

Figure 2:
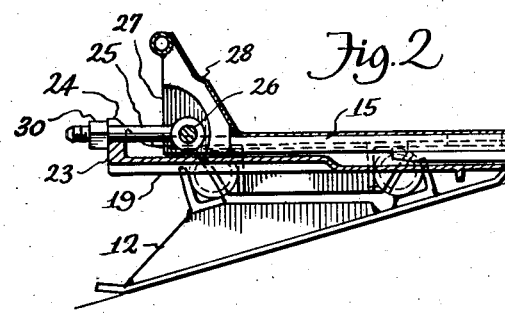
Figure 2 is a transverse sectional view taken substantially along line 2—2 of Figure 1.
Figure 4:
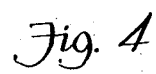
Figure 4 is a fragmentary plan view drawn to a smaller scale than Figure 1 and showing a connecting means constructed in accordance with my invention applied to a conventional form of conveyer trough.
Figure 5:
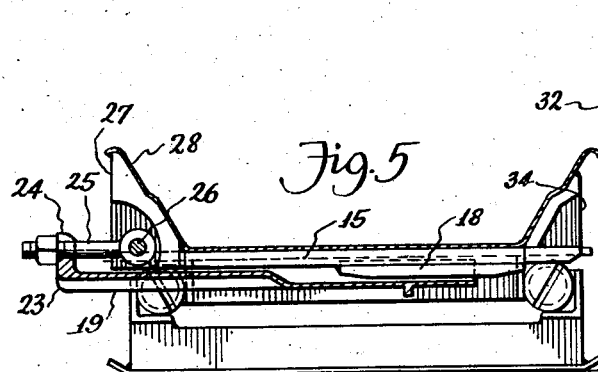
Figure 5 is a transverse sectional view taken substantially along line 5—5 of Figure 4.
Figure 3:
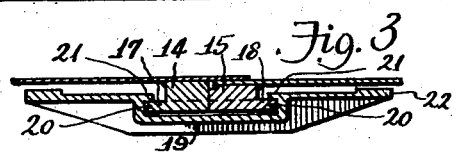
Figure 3 is a sectional view taken substantially along line 3—3 of Figure 1.

The connecting means shown in Figures 4 and 5 is substantially the same as that shown in Figures 1, 2 and 3, so the same part numbers will be applied thereto that were applied to the connecting means shown in Figures 1, 2 and 3. In Figures 4 and 5, the connecting means 11 is shown as being applied to connect adjacent ends of a pair of shaker conveyer troughs 31, 31 together. Said troughs are of a conventional construction, mounted on ball frames 33, 33, and are herein shown as being disposed adjacent a coal face 32. In order to increase the length of the abutting surfaces of the plates 14 and 15 and to form a greater bearing area at the joint between said troughs, and in order to reinforce the sides of said troughs at the joint where said troughs are connected together, members 34, 34 are herein shown as forming a continuation of the plates 14 and 15. Said members extend laterally beyond the ends of said plates and upwardly along the side of said trough opposite from the eyebolt 25.

It may be seen from the foregoing that a novel form of connecting means has been provided for positively connecting adjacent ends of the trough sections of a shaker conveyer trough or pan line together from one side of the pan line, which is particularly advantageous for use where the pan line extends close to a mine face, and which is of a simple construction permitting the pan sections to be readily connected or disconnected with a minimum amount of manual effort.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. A connecting means for connecting adjacent ends of a pair of shaker conveyer troughs together including a pair of plate members extending across the bottoms of adjacent ends of said troughs, each of said plate members having an inner abutting face and an outer inclined engaging face, said outer faces being of a wedge-shaped formation when said inner faces are in engagement with each other, and means operable from one side of said troughs only and extending across the bottom of said troughs and having engagement with said wedge-shaped outer faces, for drawing said troughs together and for holding them in connected relation with respect to each other.

2. A connecting means for a pair of conveyer troughs including a pair of plate members extending across the bottoms of adjacent ends of said troughs, each of said plate members having an inner abutting face and an outer inclined engaging face, said outer inclined engaging faces being so arranged that when said abutting faces abut each other, said outer faces will form in effect a wedge, a clamping member having a pair of facing inner inclined engaging faces adapted to have slidable engagement with said engaging faces on said plate members, and means operable from one side of said troughs only for moving said clamping member along said inclined engaging faces, to draw said troughs together and for holding said clamping member in position to hold said troughs in fixed relation with respect to each other.

3. A connecting means for a pair of conveyer troughs including a pair of plate members extending across the bottoms of adjacent ends of said troughs, each of said plate members having an inner abutting face and an outer inclined engaging face, said outer inclined engaging faces being disposed adjacent one side of said troughs and being so arranged that when said abutting faces are in engagement with each other, said outer faces will together be of a wedge-shaped formation, a clamping member having a pair of facing inner inclined engaging faces adapted to have slidable engagement with said engaging faces on said plate members, and means operable from the side of said troughs opposite from said inclined engaging faces of said plate members, to draw said troughs together and to hold said clamping member in position to hold said troughs in fixed relation with respect to each other.

4. A connecting means for a pair of conveyer troughs including a pair of plate members extending across the bottoms of adjacent ends of said troughs, each of said plate members having an inner abutting face and an outer inclined engaging face, said outer inclined engaging faces being disposed adjacent one side of said troughs and being so arranged that when said abutting faces are in engagement with each other, said outer faces will together be of a wedge-shaped formation, a clamping member having a pair of facing inner inclined engaging faces adapted to have slidable engagement with said engaging faces on said plate members, means at the side of said troughs, opposite from said inclined engaging faces of said plate members, for holding said sides of said troughs together, and other means adjacent said last mentioned holding means for moving said clamping member in a direction to draw said troughs together, and to hold said clamping member in position to hold the opposite sides of said troughs in fixed relation with respect to each other.

5. A connecting means for connecting adjacent ends of a pair of shaker conveyer troughs together including a pair of plate members extending across the bottoms of adjacent ends of said troughs, each of said plate members having an inner abutting face and an outer inclined engaging face, said outer faces being of a wedge-shaped formation when said inner faces are in engagement with each other, and means operable from one side of said troughs and having engagement with said wedge-shaped outer faces, for drawing said trough sections together and for holding them in connected relation with respect to each other, including a clamping member extending beneath said troughs and having inclined engaging faces having engagement with said outer faces of said plate members, and having another portion extending beyond the side of said troughs opposite from said engaging faces, and means engageable with said outer portion of said clamping member, for moving said clamping member in a direction to draw said troughs together.

6. A connecting means for connecting adjacent ends of a pair of shaker conveyer troughs together including a pair of plate members extending across the bottoms of adjacent ends of said troughs, each of said plate members having an inner abutting face and an outer inclined engaging face, said outer faces being of a wedge-shaped formation when said inner faces are in engagement with each other, and means operable from one side of said troughs and having engagement with said wedge-shaped outer faces, for drawing said trough sections together and for holding them in connected relation with respect to each other, including a clamping member extending beneath said troughs and having inclined engaging faces having engagement with said outer faces of said plate members, and having another portion extending beyond the side of said troughs opposite from said engaging faces, and means engageable with said outer portion of said clamping member, for moving said clamping member in a direction to draw said troughs together, including an eyebolt extending transversely of said troughs, and a nut on said eyebolt having engagement with said outer portion of said clamping member.

7. A connecting means for a pair of conveyer troughs including a pair of plate members extending across the bottoms of adjacent ends of said troughs, each of said plate members having an inner abutting face and an outer inclined engaging face, said outer inclined engaging faces being disposed adjacent one lateral side of said troughs and being so arranged that when said abutting faces are in engagement with each other, said outer faces will together be of a wedge-shaped formation, a clamping member having a pair of facing inner inclined engaging faces adapted to have slidable engagement with said engaging faces on said abutting members, a connecting bolt at the side of said troughs opposite from said inclined engaging faces of said plate members, for holding said side of said troughs together, an eyebolt pivotally mounted on said connecting bolt, and a nut on said eyebolt having engagement with said clamping member for moving said clamping member in a direction to draw said troughs together and for holding said clamping member in position to hold said troughs in fixed relation with respect to each other.

ERNST R. BERGMANN.